US008921747B2

(12) United States Patent
Wang et al.

(10) Patent No.: US 8,921,747 B2
(45) Date of Patent: Dec. 30, 2014

(54) ELECTRIC HEATING APPLIANCE WITH AC-LINE FILTER WITH LOW LEAKAGE CURRENT

(75) Inventors: Dongyu Wang, Hendersonville, TN (US); Gianluca Venturini, Forli (IT)

(73) Assignee: Electrolux Home Products, Inc., Cleveland, OH (US)

( * ) Notice: Subject to any disclaimer, the term of this patent is extended or adjusted under 35 U.S.C. 154(b) by 452 days.

(21) Appl. No.: 13/047,146

(22) Filed: Mar. 14, 2011

(65) Prior Publication Data

US 2012/0234825 A1    Sep. 20, 2012

(51) Int. Cl.
  H05B 6/04     (2006.01)
  H05B 6/12     (2006.01)
  H05B 1/02     (2006.01)
  H02M 1/12     (2006.01)
  H05B 6/06     (2006.01)

(52) U.S. Cl.
  CPC ............. *H05B 1/0227* (2013.01); *H02M 1/126* (2013.01); *H05B 6/04* (2013.01); *H05B 6/062* (2013.01); *H02M 2001/123* (2013.01)
  USPC ............................. 219/660; 219/620; 219/621

(58) Field of Classification Search
  USPC .......... 219/620–622, 624, 660, 672, 675–676
  See application file for complete search history.

(56) References Cited

U.S. PATENT DOCUMENTS

| 4,013,859 | A |   | 3/1977 | Peters |
| 4,686,614 | A |   | 8/1987 | Costello |
| 4,825,028 | A | * | 4/1989 | Smith ........................... 219/716 |
| 5,757,628 | A | * | 5/1998 | Kamata ........................... 361/40 |
| 7,583,136 | B2 |  | 9/2009 | Pelly |
| 7,659,797 | B2 |  | 2/2010 | Tucker |
| 2008/0223852 | A1 |  | 9/2008 | Bassill et al. |
| 2010/0176120 | A1 | * | 7/2010 | Watanabe et al. ............. 219/624 |

FOREIGN PATENT DOCUMENTS

| CN | 201594793 | 9/2010 |
| EP | 1255421 | 11/2002 |
| WO | 2010133721 | 11/2010 |

OTHER PUBLICATIONS

International Search Report for PCT/US2012/028697, dated May 30, 2012, 2 pages.
Application of Optimization Techniques to the Design of a Boost Power Factor Correction Converter (Sergio Busquets-Monge)—Jul. 2001, 186 pages.

(Continued)

*Primary Examiner* — Tu B Hoang
*Assistant Examiner* — Michael Hoang
(74) *Attorney, Agent, or Firm* — Pearne & Gordon LLP

(57) ABSTRACT

A power supply includes a filter that attenuates a noise component being transmitted toward a source that supplies an AC current. The filter lacks a capacitor establishing a conductive path for conducting a high-frequency alternating signal, a leakage current, or both to a ground electrode. A rectifier is included, and is disposed electrically between the filter and a load that is to be energized by operation of the power supply. The rectifier converts AC into a rectified signal. The power supply also includes a grounding capacitor that establishes a capacitive, conductive path between an output of the rectifier and a ground electrode that is to be electrically connected to ground. The grounding capacitor is electrically separated from the filter by the rectifier, and extends electrically between the ground electrode and at least one of: a positive DC bus conductor from the rectifier, and a DC bus return to the rectifier.

12 Claims, 4 Drawing Sheets

(56) References Cited

OTHER PUBLICATIONS

Selecting Proper Connection Points for Y-Capacitor to Reduce EMI in SMPS (Milind M. Jha, et al.)—Feb. 2010, 6 pages.
Leakage Current in Power Line Filters, The Schaffner Group, Jul. 2008, 10 pages.
Hung-I Hsieh, Use of a Cz Common-Mode Capacitor in Two-Wire Offline Power Supplies, IEEE Transactions on Industrial Electronics, vol. 55, No. 3, Mar. 2008, 9 pages.
Milind M. Jha, Estimation of Optimum Value of Y-Capacitor for Reducing EMI in Switch Mode Power Supplies, Electrical Power Quality and Utilisation, Journal vol. XV, No. 2, 2009, 47 pages.

* cited by examiner

ELECTRIC HEATING APPLIANCE WITH AC-LINE FILTER WITH LOW LEAKAGE CURRENT

BACKGROUND OF THE INVENTION

1. Field of the Invention

This application relates generally to a method and apparatus for filtering an electric signal and, more specifically, to an electric heating appliance comprising an AC line filter without a grounding capacitor to limit earth leakage currents.

2. Description of Related Art

Electric appliances such as an electric range converts AC electric current introduced to the range into heat for elevating the temperature of food, for example. Like any electric device, electric appliances are made up of electronic and electric components that store and discharge a portion of this electric current. The electric current discharged from the components, commonly referred to as leakage current, is typically conducted to ground by a protective conductor including a grounding capacitor coupled between the AC line and ground. Without the protective conductor and grounding capacitor, the leakage current could potentially be discharged through any conductive part, or a surface of a non-conductive part of the electric range through any, possibly undesirable, conductive path to ground.

A power AC line filter can also be provided to an electric appliance to attenuate at least a portion of the electromagnetic interference ("EMI") conducted along the AC power line of those appliances. The protective conductor and grounding capacitor combination that discharges the leakage current is included in such EMI filters to shunt high-frequency interference from the AC electric current to ground in addition to discharging the leakage current. The EMI filter has traditionally been provided to electric appliances at the AC input where the AC electric current is introduced to the electric appliance. In such a location, the EMI filter including the protective conductor and grounding capacitor can attenuate the EMI seen by the AC mains.

The design of conventional EMI filters including the grounding capacitor for discharging the leakage current has been limited by competing design interests. On the one hand, the value of the leakage current discharged via the grounding capacitor is a function of, and optionally proportional to, the capacitance value of the grounding capacitor. By minimizing the capacitance value of the grounding capacitor, the undesired leakage current can also be minimized.

But on the other hand, the degree of attenuation achievable by the EMI filter can also be a function of, and optionally proportional to, the capacitance value of the grounding capacitor. Increasing the capacitance value of the grounding capacitor increases the effectiveness of the EMI filter in attenuating radio-frequency and other noise having a high frequency relative to the frequency of the AC electric current. Thus, electric appliances provided with traditional EMI filters including the grounding capacitor have required balancing the desire to limit the leakage current through the grounding capacitor and the desire to attenuate the EMI in the AC electric current.

BRIEF SUMMARY

According to one aspect, the subject application involves an electric heating appliance including an input where AC electric current is introduced to the electric heating appliance, and a heating element that generates heat in response to being electrically energized by electric energy. A filter can also be provided to attenuate EMI noise being returned toward the input where the AC electric current is supplied. The noise has a frequency that is greater than the input frequency of the AC electric current, and the filter is devoid of capacitors establishing a conductive path for a high-frequency alternating signal to a ground electrode. A rectifier is disposed electrically between the filter and the heating element to convert the AC electric current into a rectified signal. Further, a grounding capacitor is provided to establish a capacitive, conductive path between an output of the rectifier and a ground electrode. The grounding capacitor is electrically disposed between the rectifier and the heating element.

According to another aspect, the subject application involves a power supply apparatus for driving an electric load. The power supply apparatus includes a filter that attenuates a noise component being returned from the load toward a source supplying an AC electric current. The noise component has a frequency that is greater than a frequency of the AC electric current, and the filter lacks a capacitor establishing a conductive path for conducting a high-frequency alternating signal and a leakage current to a ground electrode. A rectifier is also included, and is disposed electrically between the filter and a load to be energized by operation of the power supply circuit to convert the AC electric current into a rectified signal. The power supply apparatus also includes a grounding capacitor that establishes a capacitive, conductive path between an output of the rectifier and a ground electrode that is to be electrically connected to earth ground. The grounding capacitor is electrically separated from the filter by the rectifier, and extends electrically between the ground conductor and at least one of: (i) a positive DC bus conductor from the rectifier, and (ii) a DC bus return to the rectifier. An inverter is also included in the power supply apparatus to convert the rectified signal into a high-frequency alternating signal that is to be introduced to the load.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
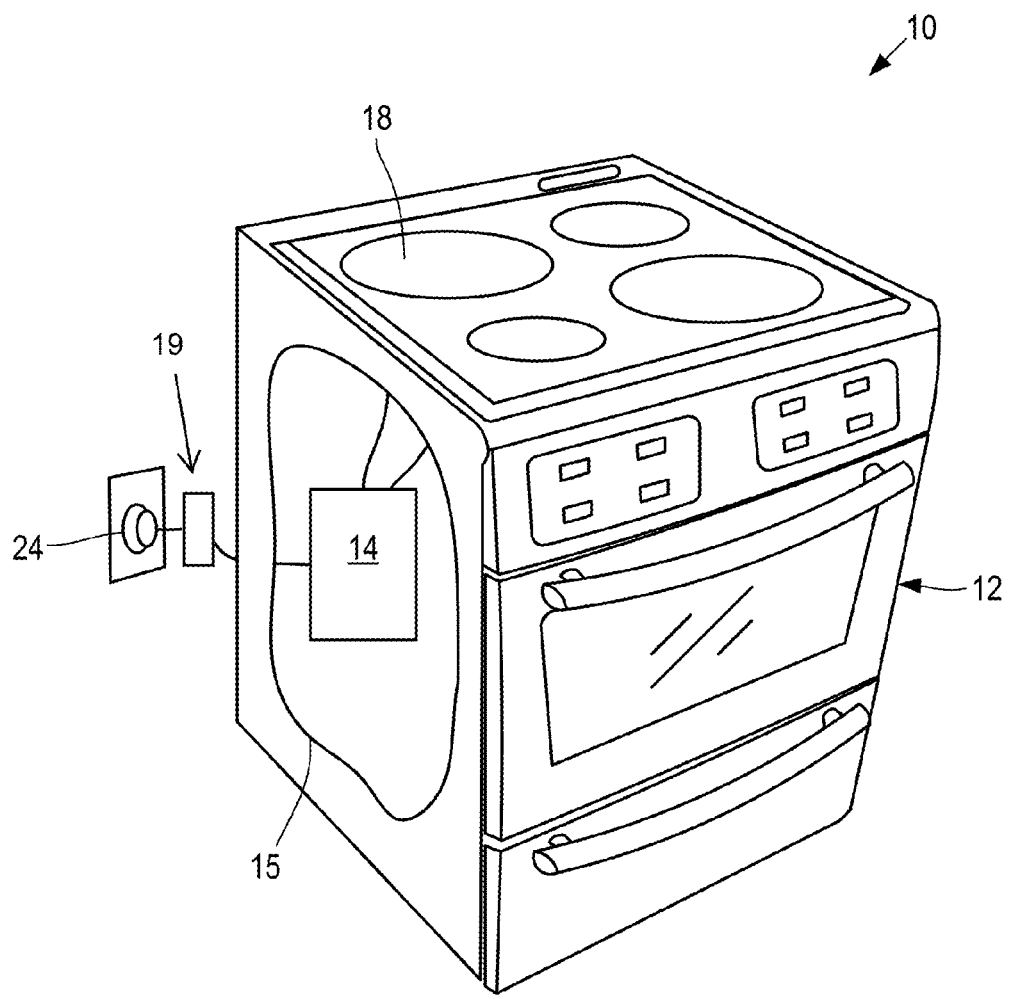
FIG. 1 shows an illustrative embodiment of an electric heating appliance provided with a power supply unit that includes an EMI filter lacking grounding capacitors.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows an illustrative embodiment of an electric heating appliance embodied as an induction cooktop 10. The induction cooktop 10 is illustrated in FIG. 1 in combination with an oven 12, but alternate embodiments of the electric heating appliance can include a stand-alone induction cooktop 10 by itself, without the oven 12. Further, a power supply unit 14 and an electromagnetic interference ("EMI") filter 16 (FIGS. 2 and 3) are shown through a cutaway portion 15 of the heating appliance and are described herein as supplying electric energy to energize a heating element, such as an inductive coil 18 as shown in FIG. 1 for example, for the sake of clarity. When energized, the inductive coil 18 induces an electric current in a cooking container such as a pan (not shown) placed atop the inductive coil 18. However, it is to be understood that the power supply unit 14 and EMI filter 16 herein are suitable to supply electricity to energize any desired load, such as a resistive or any other type of heating element that generates heat when electrically energized.

Figure 2:
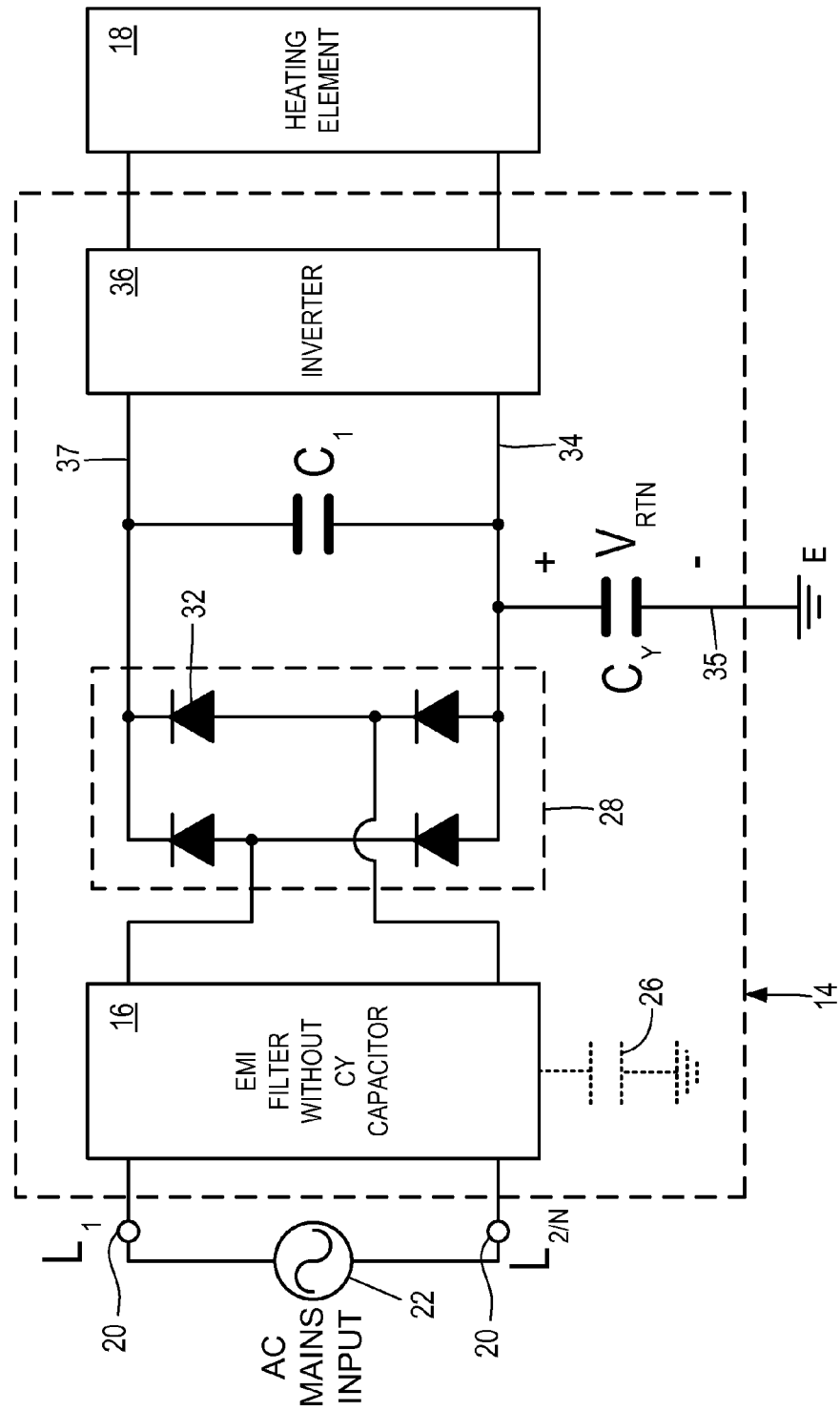
FIG. 2 shows an illustrative embodiment of a power supply unit that includes an EMI filter lacking grounding capacitors, the power supply unit also including a grounding capacitor electrically connected between a DC bus return and earth ground.
Figure 3:
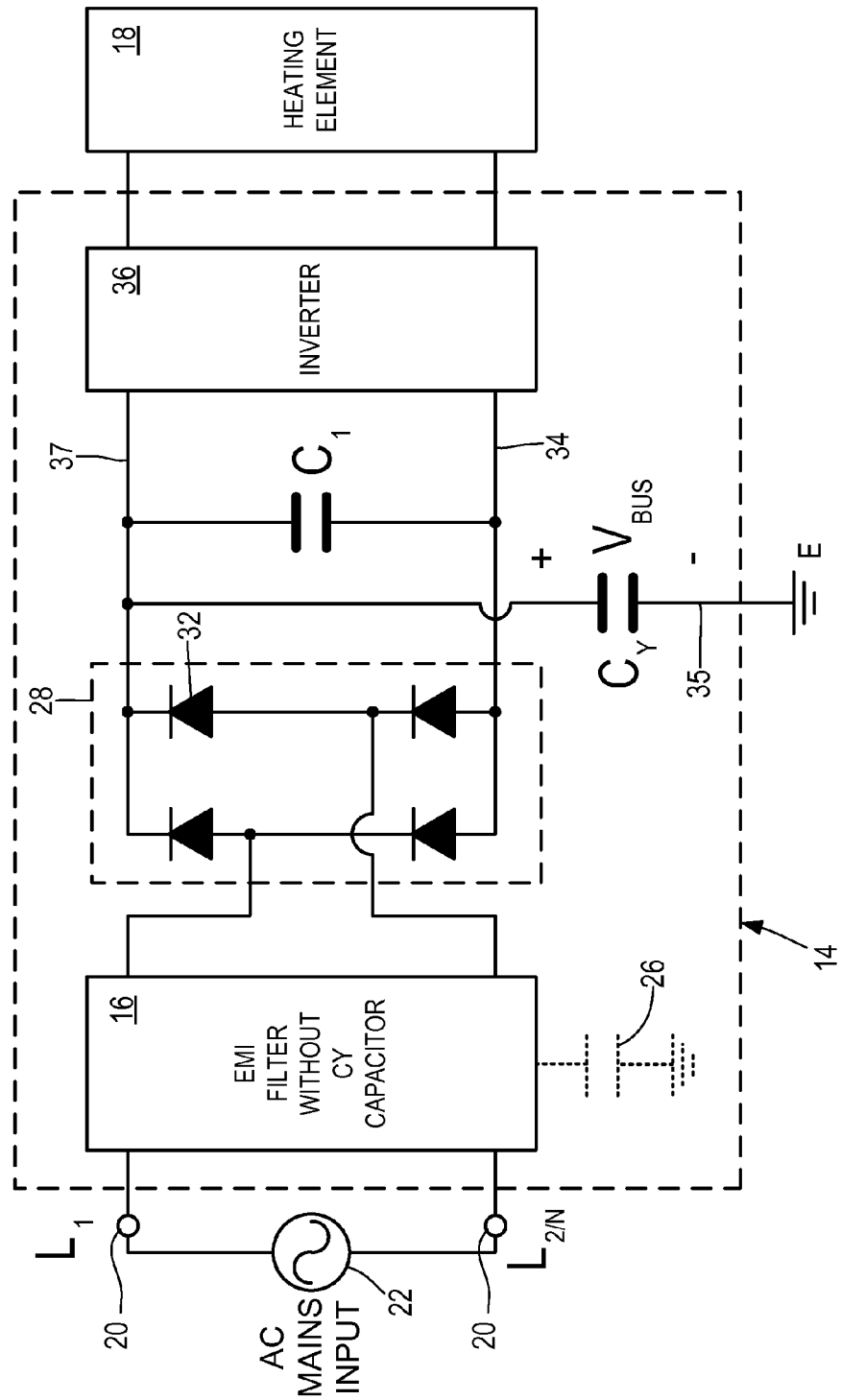
FIG. 3 shows an illustrative embodiment of a power supply unit that includes an EMI filter lacking grounding capacitors, the power supply unit also including a grounding capacitor electrically connected between a positive DC bus conductor and earth ground.

As shown in FIGS. 2 and 3, the power supply unit 14 provided to the induction cooktop 10 includes input terminals 20 where an AC electric current for energizing the inductive coil 18 heating element is introduced to the induction cooktop 10. The AC electric current can be supplied by an AC mains input 22 such as a wall outlet 24 (FIG. 1) commonly found in residential dwellings. According to an illustrative embodiment, the AC electric current supplied by the AC mains can be a generally sinusoidal signal having an input frequency of approximately 50 or 60 Hz and a RMS voltage of approximately 120 $V_{RMS}$ or higher. According to other embodiments, the AC electric current supplied by the can be a generally sinusoidal signal having an input frequency of approximately 50 Hz and a RMS voltage of approximately 230 $V_{RMS}$ or approximately 240 $V_{RMS}$.

The AC electric current input via the input terminals 20 is then introduced to the EMI filter 16 to at least partially filter noise introduced by the inductive coil 18 or other load that is returned to the AC mains input 22. An example of a single-stage EMI filter 16 is shown schematically in FIG. 4. As shown, the EMI filter 16 includes a parallel arrangement of capacitive C and resistive R impedances, and a common-mode choke 17 comprising a pair of inductive L impedances, one of which is in series with positive signal input $L_1$ and the other of which is in series with the return signal input L2. Each of the inductive L impedances has the same polarity, and is used to attenuate common-mode noise conducted in the same direction along both the positive bus and the return bus. Grounding capacitors 26 (shown in broken lines), also commonly referred to as Y-capacitors 26, extending between the EMI filter 16 and earth ground found in conventional filters, are absent from the EMI filter 16. The grounding capacitors 26 omitted from the EMI filter 16 are drawn in broken lines in FIGS. 2, 3 and 4 simply to illustrate a position of the grounding capacitors 26 in conventional filters relative to other components included in the power supply unit 14 such as a rectifier 28, shown in FIGS. 2 and 3.

Figure 4:
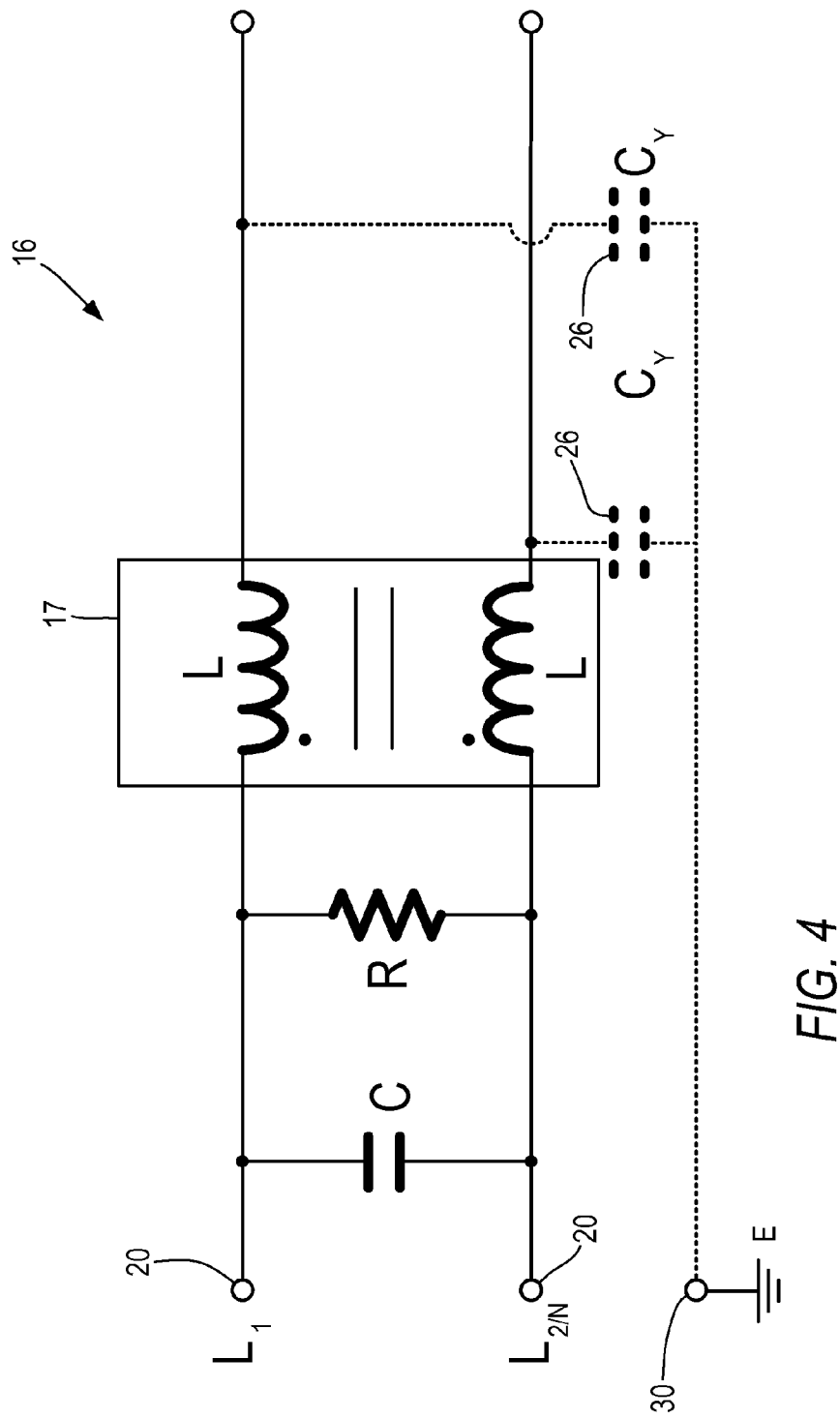
FIG. 4 schematically illustrates an embodiment of an EMI filter lacking grounding capacitors that extend between the EMI filter and earth ground.

If present in the EMI filter 26, the grounding capacitors 26 would establish a conductive path for leakage current to be conducted to a grounding electrode 30 that is to be at earth ground E potential when the induction cooktop 10 is installed. The leakage current for the filter in FIG. 4 if the grounding capacitors were present would be represented by the equation:

$$I_{leakage} = 2\pi f V C$$

where f is the frequency of the AC mains connected to the filter, V is the maximum RMS voltage between L1 or L2/N and earth ground E, and C is the total, combined capacitance of all grounding capacitors 26 extending between the filter and earth ground E. Thus, for a given frequency and voltage, lowering the capacitance C of the grounding capacitors extending between the filter and earth ground could limit the leakage current to desirable levels. However, lowering the total capacitance C of the filter would interfere with attenuation of the line conducted noise emissions. Thus, installing grounding capacitors 26 between the filter and earth ground would require a tradeoff between leakage current reduction and noise attenuation. Accordingly, the EMI filter 16 of FIG. 4 is devoid of such grounding capacitors 26 extending between the EMI filter 16 and earth ground.

The EMI filter 16 attenuates line-conducted noise emissions returned toward the AC mains input 22 from the inductive coil 18 from the AC electric current used to energize the inductive coil 18. The noise has a frequency that is greater than the input frequency of the AC electric current. For example, the AC electric current can have a frequency of approximately 50 or 60 Hz, and noise components appearing in the AC electric current waveform can be at least two orders of magnitude greater. According to illustrative embodiments, the noise components to be filtered from the AC electric current include signals having a frequency of at least 9 kHz, and optionally at least 100 kHz. Such illustrative embodiments of the EMI filter 16 can also filter noise components having frequencies up to 5 MHz, and optionally up to 10 Mhz, or 20 MHz, or greater.

The AC electric current input from the AC mains input 22 is subsequently converted to a rectified signal by the rectifier 28, shown in FIGS. 2 and 3. The illustrative embodiment of the rectifier 28 shown in FIGS. 2 and 3 is a full-wave rectification circuit, including a full-bridge configuration of diodes 32 or other suitable, unidirectional-conducting circuit components. The full-wave embodiment of the rectifier 28 transmits both the positive half-cycle and the negative half-cycle of the oscillating waveform of the AC electric current. However, both half-cycles of the waveform are emitted from the rectifier 28 as positive half cycles forming the rectified signal. Although shown as a full-wave rectifier, the rectifier 28 can be a half-wave rectifier, or any other apparatus for at least partially converting an AC waveform of the AC electric current from the EMI filter 16 into a rectified signal that is more-unidirectional than the oscillating waveform of the AC electric current.

A smoothing capacitor $C_1$ can be provided across the output of the rectifier 28. The smoothing capacitor $C_1$ establishes a conductive path along which an oscillating component of the rectified signal can be conducted to a DC bus return 34. Further, the smoothing capacitor $C_1$ resists voltage oscillations, promoting a substantially-constant waveform of the rectified signal. Thus, the waveform of the rectified signal resulting from the presence of the smoothing capacitor $C_1$ closely approximates that of a DC signal.

In FIG. 2, a grounding capacitor $C_Y$ is electrically connected between the DC bus return 34 and a ground electrode 35 that is to be connected to earth ground when the induction cooktop 10 is installed. For the embodiment shown in FIG. 2, the grounding electrode $C_Y$ is electrically separated from the EMI filter 16 by the rectifier 28 in the power supply unit 14, and is so located instead of being provided to the EMI filter 16, which is devoid of such grounding capacitors $C_Y$. The grounding capacitor $C_Y$ in FIG. 2 establishes a capacitive conductive path between an output of the rectifier 28 and the ground electrode 35, and is electrically disposed within the power supply unit 14 to be located between the rectifier 28 and the inductive coil 18.

Positioned as shown in FIG. 2, the grounding capacitor $C_Y$ is exposed to the rectified signal, having a more generally-constant, DC waveform rather than the alternating waveform of the AC electric current supplied by the AC mains input 22. Accordingly, the leakage current through the grounding capacitor $C_Y$ in FIG. 2, which is a function of, and optionally proportional to the frequency as shown by the equation set forth above, is substantially reduced from the leakage current that would result if the same grounding capacitor $C_Y$ were to be provided to the EMI filter 16 and exposed to the relatively less voltage variance across $C_Y$. Accordingly, due to the lower leakage current through the grounding capacitor $C_Y$ positioned as shown in FIG. 2 than through a conventional grounding capacitor 26 provided to a filter, a greater capacitance value can be selected for the grounding capacitor $C_Y$ than for a conventional grounding capacitor 26 provided to the filter to achieve the desired noise attenuation performance.

The rectified signal can then be supplied to an inverter 36 that converts the rectified signal into a high-frequency energizing signal that is to be introduced to the inductive coil 18 to electrically energize the inductive coil 18. The inverter 36 can be any suitable device, such as a full-bridge inverter for example, that can convert a substantially DC signal into an alternating signal as is known in the art.

According to illustrative embodiments, the power supply unit 14 including the EMI filter 16 without a grounding capacitor, which is instead provided as shown in, and described with reference to FIG. 2, achieves radio-frequency voltage levels that average less than 46 dBµV within a frequency range that extends from about 500 kHz to about 5 MHz. Such an average is based on the measurement of the radio frequency voltage between the power line and ground using a 50 µH/50Ω line impedance stabilization network 19. Additionally, the grounding capacitor comprises a capacitance value that limits a leakage current having a frequency of about 60 Hz or less and a maximum voltage of about 120 $V_{RMS}$ conducted by the capacitive conductive path to less than about 3,500 µA. For other embodiments, the capacitance value of the grounding capacitor $C_Y$ limits the leakage current having a frequency of about 60 Hz or less and a maximum voltage of about 120 $V_{RMS}$ conducted by the capacitive conductive path to less than about 500 µA.

The illustrative embodiment shown in FIG. 3 differs from that shown in FIG. 2 in that the grounding capacitor is electrically connected between a positive DC bus conductor 37 from the rectifier 28 and the ground electrode 35. Similar to the embodiment shown in FIG. 2, the present embodiment electrically separates the grounding capacitor $C_Y$ from the EMI filter 16, which lacks any grounding capacitors. As described above, the grounding capacitor $C_Y$ is exposed to the rectified signal instead of the AC electric current by the AC mains input 22. Accordingly, the leakage current through the grounding capacitor $C_Y$ is substantially reduced from the leakage current that would result if the same grounding capacitor $C_Y$ were to be provided to the EMI filter 16 and exposed to the relatively smaller voltage variance across $C_Y$. Due to the lower leakage current through the grounding capacitor $C_Y$ positioned as shown in FIG. 3 than through a conventional grounding capacitor 26 provided to a filter, a greater capacitance value can be selected for the grounding capacitor $C_Y$ than for a conventional grounding capacitor 26 provided to the filter to achieve the desired noise attenuation performance.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electric heating appliance comprising:
    an input where AC electric current having an input frequency is introduced to the electric heating appliance;
    a heating element that generates heat in response to being electrically energized by electric energy;
    a filter that attenuates a noise component being conducted toward the input, said noise having a frequency that is greater than the input frequency of the AC electric current, wherein the filter is devoid of capacitors that would otherwise establish a conductive path for a high-frequency alternating signal to a ground electrode;
    a rectifier disposed electrically between the filter and the heating element, wherein the rectifier converts the AC electric current into a rectified signal provided between a positive DC bus and a DC bus return;
    a smoothing capacitor connected across an output of the rectifier between the positive DC bus and the DC bus return; and
    a grounding capacitor that establishes a capacitive conductive path between the output of the rectifier and a ground electrode, the grounding capacitor being electrically disposed between the rectifier and the heating element, wherein the smoothing capacitor is connected to the ground electrode through the grounding capacitor,
    wherein a radio-frequency voltage conducted between the input and the heating element of the electric heating appliance comprises an average that is less than 46 dBµV within a frequency range that extends from 500 kHz to 5 MHz and measured using a 50 µH/50Ω line impedance stabilization network, and the grounding capacitor comprises a capacitance value that limits a leakage current having a frequency of 60 Hz or less and a maximum voltage of 120 $V_{RMS}$ conducted by the capacitive conductive path to less than 3,500 µA.

2. The electric heating appliance of claim 1, wherein the grounding capacitor establishes the capacitive conductive path between a positive DC bus conductor and the ground electrode, wherein the ground electrode is electrically connected to earth ground when the electric heating appliance is installed.

3. The electric heating appliance of claim 1, wherein the heating element is an inductive heating element that, when energized, induces an electric current in a cooking container placed adjacent to the heating element.

4. The electric heating appliance of claim 1 further comprising an inverter that converts the rectified signal into a high-frequency energizing signal that is introduced to the heating element to electrically energize the heating element.

5. The electric heating appliance of claim 1, wherein the capacitance value of the grounding capacitor limits the leakage current having the frequency of 60 Hz or less and the maximum voltage of 120 $V_{RMS}$ conducted by the capacitive conductive path to less than 500 µA.

6. The electric heating appliance of claim 1, wherein the filter is disposed electrically between the input and the rectifier.

7. The electric heating appliance of claim 1, wherein the rectifier is a full-wave rectifier.

8. The electric heating appliance of claim 1, wherein the positive DC bus is connected to the ground electrode through the grounding capacitor, and the DC bus return is not connected to the ground electrode.

9. The electric heating appliance of claim 1, wherein the DC bus return is connected to the ground electrode through the grounding capacitor, and the positive DC bus is not connected to the ground electrode.

10. A power supply apparatus for driving an electric load, the power supply apparatus comprising:
    a filter that attenuates a noise component being conducted toward an input where an AC electric current is introduced to the power supply apparatus, said noise component having a frequency that is greater than a frequency of the AC electric current, wherein the filter lacks a capacitor establishing a conductive path for conducting a high-frequency alternating signal and a leakage current to a ground electrode;
    a rectifier disposed electrically between the filter and a load to be energized by operation of the power supply circuit, wherein the rectifier converts the AC electric current into a rectified signal provided between a positive DC bus and a DC bus return;
    a smoothing capacitor connected across an output of the rectifier between the positive DC bus and the DC bus return;
    a grounding capacitor that establishes a capacitive conductive path between the output of the rectifier and a ground electrode that is to be electrically connected to earth ground, wherein the grounding capacitor extends electrically between the ground electrode and at least one of: (i) the positive DC bus, and (ii) the DC bus return, and wherein the smoothing capacitor is connected to the ground electrode through the grounding capacitor; and
    an inverter that converts the rectified signal into a high-frequency alternating signal that is to be introduced to the load,
    wherein a radio-frequency voltage conducted between the input and the electric load comprises an average that is less than 46 dBµV within a frequency range that extends from 500 kHz to 5 MHz and measured using a 50 µH/50Ω line impedance stabilization network, and the grounding capacitor comprises a capacitance value that limits a leakage current having a frequency of 60 Hz or less and a maximum voltage of 120 $V_{RMS}$ conducted by the capacitive conductive path to less than 3,500 µA.

11. The power supply apparatus of claim 10, wherein the positive DC bus is connected to the ground electrode through the grounding capacitor, and the DC bus return is not connected to the ground electrode.

12. The power supply apparatus of claim 10, wherein the DC bus return is connected to the ground electrode through the grounding capacitor, and the positive DC bus is not connected to the ground electrode.

* * * * *